Patented June 10, 1930

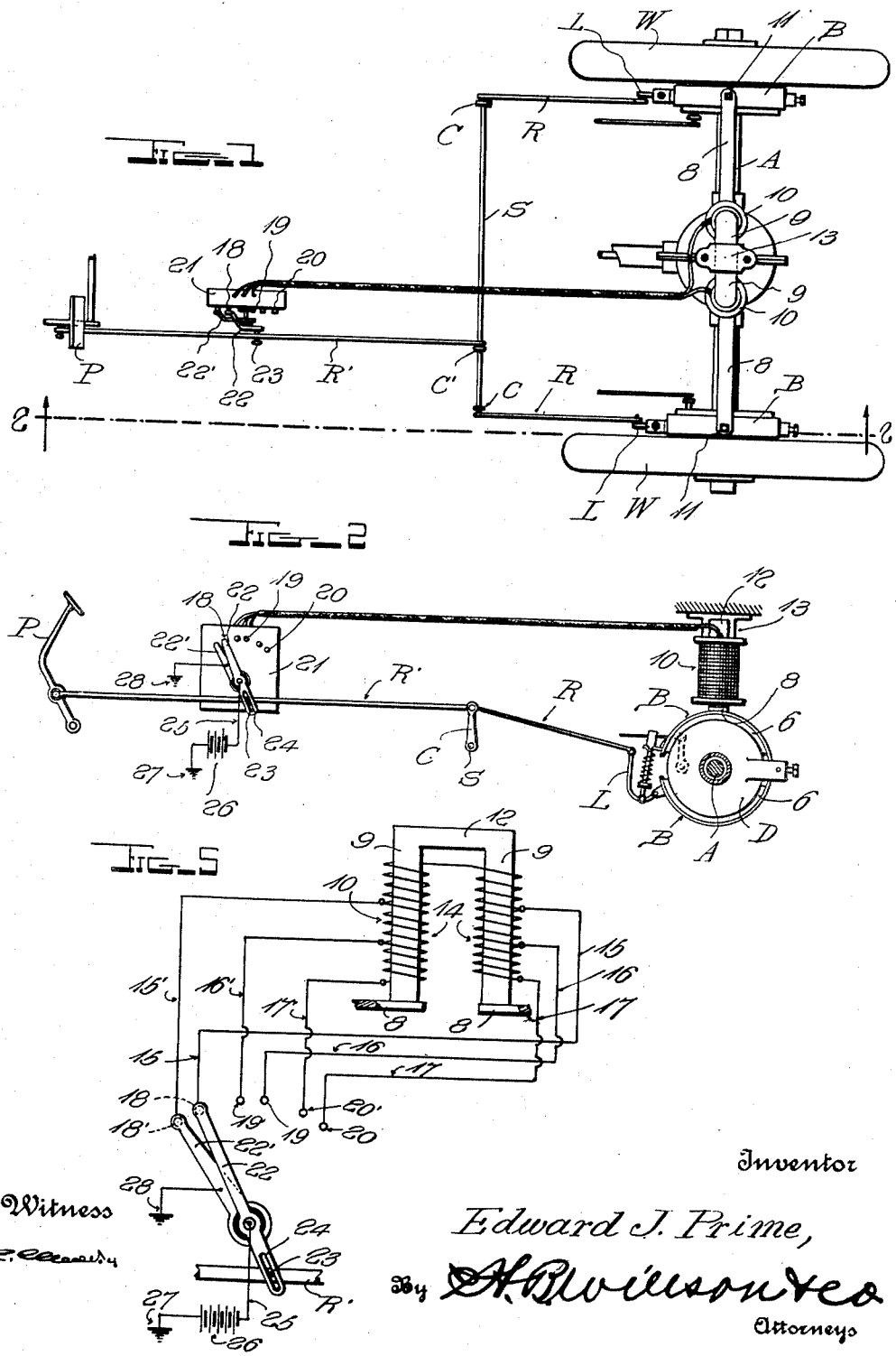

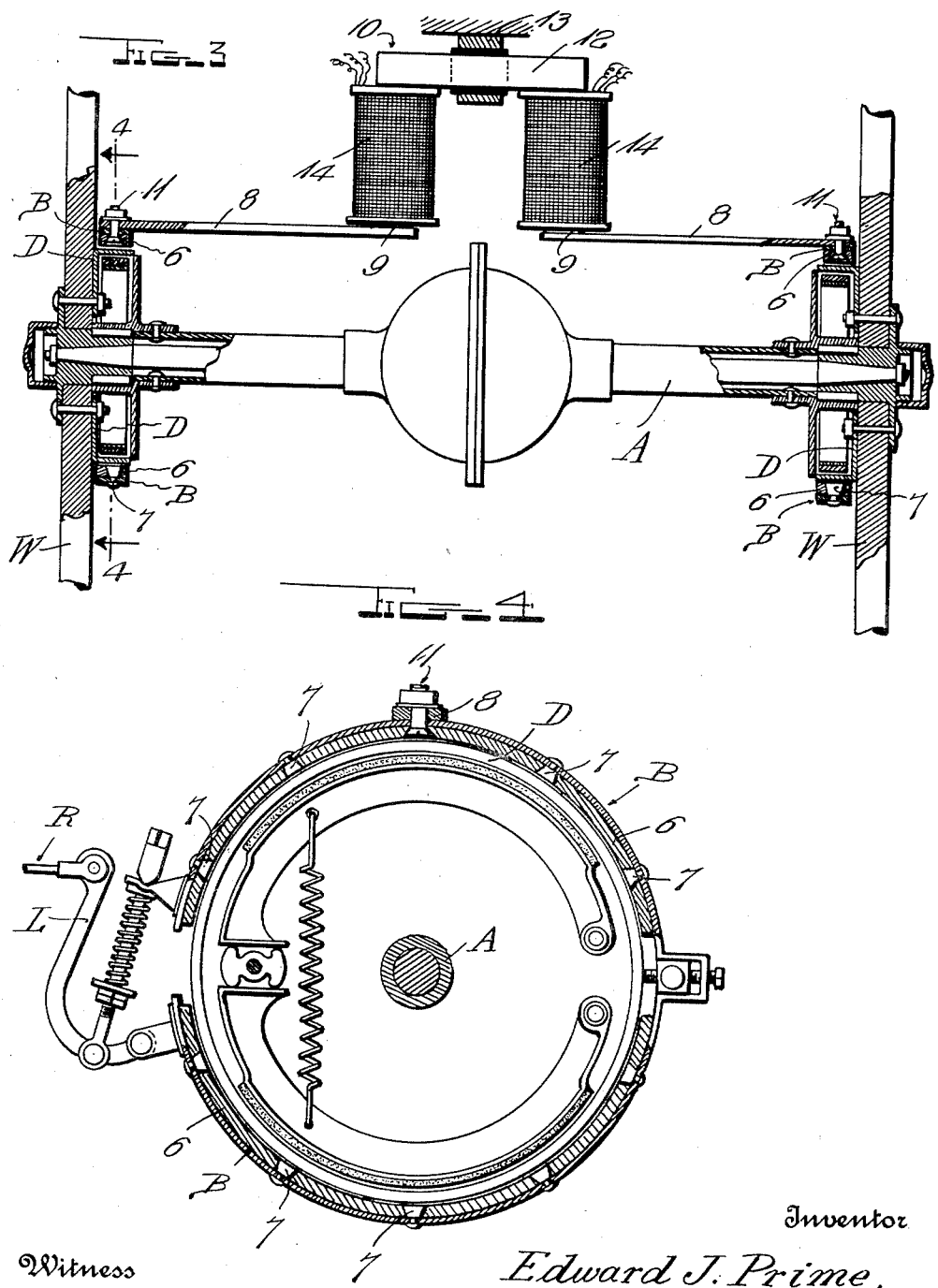

1,762,420

UNITED STATES PATENT OFFICE

EDWARD J. PRIME, OF GROVELAND, MASSACHUSETTS

COMBINED MANUALLY AND MAGNETICALLY OPERATED VEHICLE BRAKE

Application filed June 7, 1926. Serial No. 114,248.

The invention relates to improvements in brakes designed primarily for use upon motor driven vehicles, and it is one object of the invention to provide a new and improved brake means in which under ordinary circumstances, both manual power and magnetic force are used to apply the brakes, the manual operating connections however being in readiness for immediate action as the sole brake-applying means in case the magnetic means should for any reason fail to function.

Another object of the invention is to provide a novel construction and arrangement of parts for magnetizing the brake shoes to cause them to move into braking relation with the brake drums, provision being made whereby the extent of magnetizing may be varied according to the required braking action.

With the foregoing in view, the invention resides in the novel subject matter hereinafter described and claimed, the description being supplemented by the accompanying drawing.

Figure 1 is a top plan view of portions of a motor vehicle equipped with the invention.

Figure 2 is a longitudinal sectional view as indicated by line 2—2 of Fig. 1.

Figure 3 is a fragmentary rear elevation partly in section.

Figure 4 is an enlarged vertical section on the plane of line 4—4 of Fig. 3.

Figure 5 is a diagram of the electro-magnet and the current controlling means thereof.

A rear axle A is shown having the usual wheels W at its ends, which wheels are provided with brake drums D. Surrounding these brake drums and mounted in a conventional manner are brake bands B whose ends are drawn toward each other to contract the bands, when the controlling levers L thereof are forwardly pulled. These levers are by suitable connections, connected with the usual foot brake pedal P or possibly with a hand brake lever. The connections shown, include brake rods R connected with the levers L, crank arms C on a rock shaft S, to which said rods are pivoted, and a third rod R' connecting the pedal P with a crank arm C' on the shaft S. In practice, an appropriate equalizing means will of course be employed but as such means are well known, their illustration may be omitted from the present showing.

Instead of lining the brake bands B with asbestos or the like, as is customarily done, I provide soft iron linings 6 for said brake bands, these linings being preferably provided at intervals with inserts 7 of bronze or the like to give them greater braking power. These linings are connected with flexible extensions 8 on the pole pieces 9 of an appropriate electro-magnet 10, and for so connecting said linings with the extensions 8, bolts 11 of magnetic material may well be employed.

The electro-magnet 10 may well include an arched core 12 supported in any desired manner, as at 13, upon the machine, and the pole piece extensions 8 may either be integral with the ends of this core or may be suitably joined to it, but it will be understood that these pole pieces are of such metal as to be magnetized when the core 12 is energized by the magnet windings 14, so that said extensions will in turn energize the soft metal brake band linings 6, causing the latter to draw toward and contact with the brake drums D. It may also be explained that the extensions 8 are necessarily flexible to some extent to allow for vertical movement of their outer ends under the necessary contraction and expansion of the brake bands, incident to brake application and release.

Provision is made whereby the strength of the electro-magnet 10 may be controlled, according to the required braking action. For this purpose, three lead wires 15, 16 and 17 have been shown leading to the windings 14 at different points along the length thereof, and three return wires 15', 16' and 17' have been shown leading from said windings. When a circuit is completed through the wires 15 and 15' and the intervening portion of the windings 14, the core 12, extensions 8 and brake linings or shoes 6, will be only weakly energized. When a circiut is completed however, through the wires 16 and 16' and the intervening portion of the windings 14, the magnetic strength will be increased somewhat, and when current is permitted to pass through the wires 17 and 17', it flows through all of the windings 14, so that the magnetic strength is then at the maximum. For controlling the current flow to any of the pairs of wires, I have made ample provision.

The wires 15, 16 and 17 are connected to contacts 18, 19 and 20 and the wires 15', 16' and 17' are connected to contacts 18', 19' and 20' respectively, all of these contacts being mounted upon a suitable insulating base 21, appropriately mounted adjacent the brake rod R'. Co-operable with the contacts 18, 19 and 20, is a switch arm 22, while another switch arm 22' is provided for coaction with the contacts 18', 19' and 20'. These two switch arms are pivotally mounted upon the base 21 in any desired manner and by any suitable means, such as the pin and slot connection 23—24, said arms have an operating connection with the brake rod R', the arm 22 however being insulated from the arm 22'. This arm 22 is connected by a suitable conductor 25 with the positive pole of the usual battery 26 of the machine, or a battery of any desired strength, the negative pole of this battery being grounded to the frame of the machine, as indicated at 27. The arm 22' is also grounded to the frame, and 28 in the drawing illustrates the ground connection.

When the brakes are released, the switch arms 22 and 22' are free of all contacts. When the pedal or the like is operated to a slight extent, however, the switch arms 22 and 22' contact with the contacts 18 and 18' respectively, as seen in Fig. 5. Then, current flows from the battery 26 through the conductor 25 and arm 22, to the contact 18, continues from this contact through the wire 15 to the windings 14 and returns from these windings through the wire 15', contact 18' and switch arm 22' to the ground and thence to the battery 26. By traveling in this manner, a portion of the windings 14 are energized to rather weakly magnetize the core 12, the pole piece extensions 8 and the brake linings or shoes 6, as will be clear from the description given in connection with the wiring 15, 16, 17, 15', 16' and 17'. Similarly, when the pedal or the like P is operated to move the arms 22 and 22' into engagement with the contacts 19 and 19', greater magnetic strength will be imparted to the brake shoes or linings 6 and the braking power will be correspondingly increased, and when the pedal or other control has been moved to the maximum and the switch arms are in engagement with the contacts 20 and 20', the windings 14 are energized throughout their length and maximum braking power is provided.

The improved brake mechanism, it will be observed, is controlled both manually and magnetically, the two forces acting in conjunction with each other so that the vehicle may be positively stopped or may have its speed checked, as occasion may demand, with extreme ease. Moreover, in case the magnetic braking means should for any reason fail to function to effect its share of the brake-applying work, the brakes may still be effectively applied manually, and by having the magnetic means controlled by the usual brake-actuator, such as the foot pedal P, it is insured that the operator shall be in immediate readiness to perform the braking action manually, should occasion dictate that this must be done.

While good results may be obtained from the general subject matter herein disclosed, it is to be understood that within the scope of the invention as claimed, variations may be made.

I claim:

1. In combination, vehicle wheels having brake drums of magnetic metal, brake bands of magnetic metal extending around said drums, manually operated contracting means for said brake bands including a main manually operated actuator, and magnetizing means for said bands controlled by said actuator.

2. In combination, vehicle wheels having brake drums of magnetic metal, brake bands around said drums having linings of magnetic metal, manually operated contracting means for said brake bands including a main manually operated actuator, and magnetizing means for said linings controlled solely by said actuator.

3. In combination, vehicle wheels having brake drums of magnetic metal, brake bands around said drums having linings of magnetic metal, manually operated contracting means for said brake bands including a main manually operated actuator, electro-magnetic means for magnetizing said linings, and means actuated by said actuator for controlling the strength of said magnetic means proportionately with the movement of said actuator.

In testimony whereof I have hereunto affixed my signature.

EDWARD J. PRIME.